(12) United States Patent
Yuan et al.

(10) Patent No.: US 12,480,910 B2
(45) Date of Patent: Nov. 25, 2025

(54) MULTI-GAS DETECTION WITH CS-FET ARRAYS FOR FOOD QUALITY ASSESSMENT

(71) Applicant: The Regents of the University of California, Oakland, CA (US)

(72) Inventors: Zhen Yuan, San Francisco, CA (US); Mallika Bariya, San Jose, CA (US); Hossain Mohammad Fahad, Berkeley, CA (US); Rui Han, San Jose, CA (US); Niharika Gupta, Berkeley, CA (US); Ali Javey, Lafayette, CA (US)

(73) Assignee: The Regents of the University of California, Oakland, CA (US)

(*) Notice: Subject to any disclaimer, the term of this patent is extended or adjusted under 35 U.S.C. 154(b) by 735 days.

(21) Appl. No.: 17/758,221

(22) PCT Filed: Dec. 30, 2020

(86) PCT No.: PCT/US2020/067586
§ 371 (c)(1),
(2) Date: Jun. 29, 2022

(87) PCT Pub. No.: WO2021/138505
PCT Pub. Date: Jul. 8, 2021

(65) Prior Publication Data
US 2023/0022231 A1    Jan. 26, 2023

Related U.S. Application Data

(60) Provisional application No. 62/955,097, filed on Dec. 30, 2019.

(51) Int. Cl.
| | | |
|---|---|---|
| G01N 27/414 | (2006.01) | |
| G01N 33/00 | (2006.01) | |
| G01N 33/02 | (2006.01) | |

(52) U.S. Cl.
CPC ..... G01N 27/4141 (2013.01); G01N 33/0031 (2013.01); G01N 33/02 (2013.01)

(58) Field of Classification Search
None
See application file for complete search history.

(56) References Cited

U.S. PATENT DOCUMENTS

| | | |
|---|---|---|
| 4,874,500 A | 10/1989 | Madou et al. |
| 2007/0235773 A1 | 10/2007 | Eisele et al. |
| 2013/0186178 A1 | 7/2013 | Usagawa |
| 2017/0146483 A1* | 5/2017 | Javey ................ G01N 27/4148 |

(Continued)

OTHER PUBLICATIONS

Room temperature multiplexed gas sensing using chemical-sensitive 3.5-nm-thin silicon transistors. Sci. Adv.3,e1602557(2017). DOI: 10.1126/sciadv.1602557 (Year: 2017).*

(Continued)

*Primary Examiner* — Christine S. Kim
*Assistant Examiner* — Cole Leon Lindsey

(57) ABSTRACT

A multi-gas sensor to detect food spoilage and a method of forming the same are disclosed. The multi-gas sensor includes a silicon substrate and a plurality of chemical sensitive field effect transistor (CSFET) sensors formed on a surface of the silicon substrate, wherein each one of the plurality of CSFET sensors are decorated with a different material to detect a different gas associated with food spoilage.

14 Claims, 15 Drawing Sheets

(56) References Cited

U.S. PATENT DOCUMENTS

2018/0085605 A1  3/2018  Maharbiz et al.
2018/0136157 A1  5/2018  Harada et al.

OTHER PUBLICATIONS

Smart CUT™ Technology. (Dec. 20, 2016). https://www.soitec.com/en/products/smart-cut (Year: 2016).*
International Search Report and Written Opinion for PCT/US2067586, Mar. 30, 2021, 8 pages.
Fahad, Hossain Mohammad, et al. "Room Temperature Multiplexed Gas Sensing Using Chemical-Sensitive 3.5-Nm-Thin Silicon Transistors." Science Advances, vol. 3, No. 3, 2017, doi: 10.1126/sciadv.1602557.

* cited by examiner

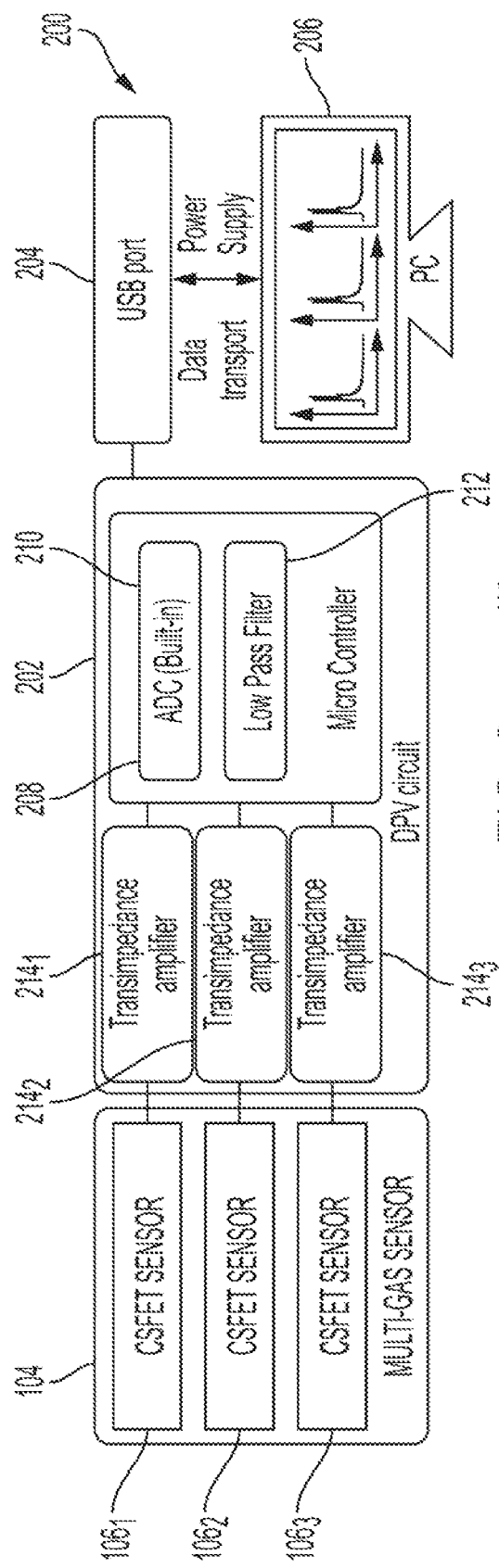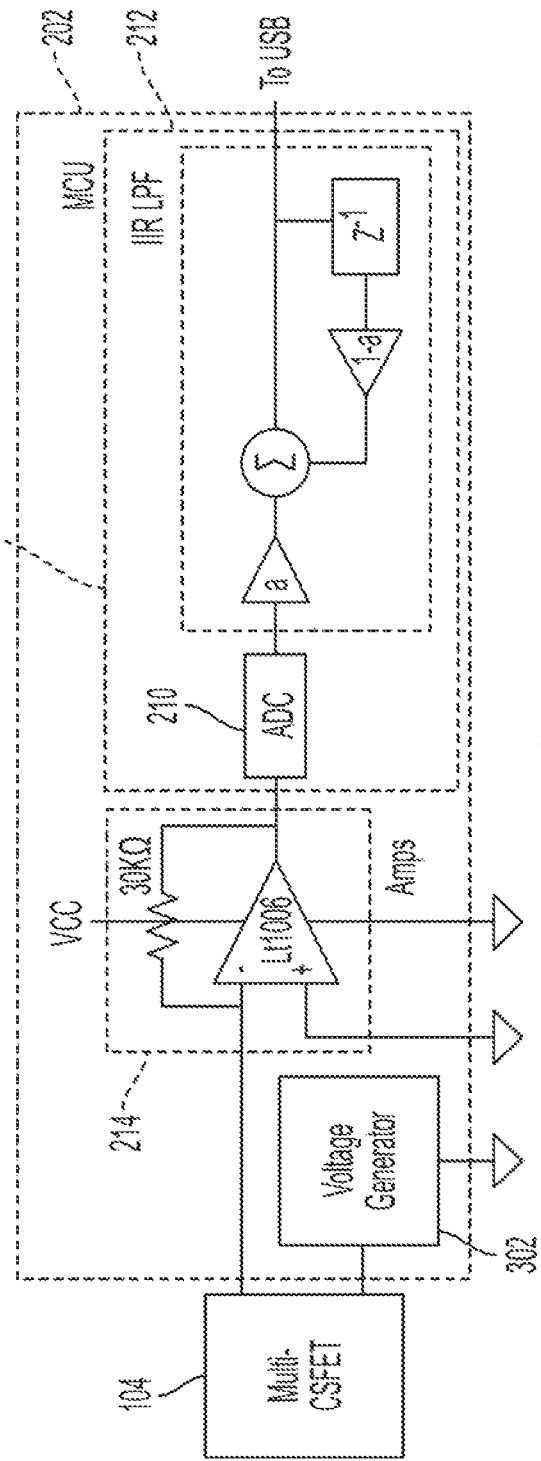
FIG. 2
FIG. 3

| Ref. | Sensitivity | Response per rpm | Tested range | Limit of detection | Materials | Temp. |
|---|---|---|---|---|---|---|
| 1 | 0.423 @ 100 ppm | 0.000423 | 1-1000 ppm | 0.5 ppm | S, N: GQDs/PANI | RT |
| 2 | 3.48 @ 100 ppm | 0.00348 | 15-1000 ppm | 15 ppm | Co-doped ZnO | RT |
| 3 | 0.86 @ 50 ppm | 0.0172 | 1-100 ppm | 1 ppm | Cu @PANI | RT |
| 4 | 0.591 @ 50 ppm | 0.01182 | 0.2-50 ppm | 0.2 ppm | Py-RGO/PANI | RT |
| 5 | 1.21 @ 10 ppm | 0.121 | 10-50 ppm | 10 ppm | rGO/WS$_2$ | RT |
| 6 | ~8 @ 5 ppm | 1.6 | 1-10 ppm | 1 ppm | WS$_2$ | RT |
| 7 | 0.92 @ 100 ppm | 0.0092 | 20-100 ppm | 0.2 ppm | MWCNTs/PANI | RT |
| 8 | ~0.2 @ 50 ppm | 0.004 | 1-50 ppm | 1 ppm | P4Tl-CF | RT |
| 9 | 2.25 @ 5 ppm | 0.45 | 5-100 ppm | 5 ppm | PTS-PAni | RT |
| this work | 13.34 @ 1 ppm | 13.34 | 0.01-5 ppm | 0.01 ppm | Ruthenium | RT |

FIG. 16

| Ref. | Sensitivity | Response per rpm | Tested range | Limit of detection | Materials | Temp. |
|---|---|---|---|---|---|---|
| 10 | 0.023 @ 1 ppm | 0.023 | 0.02-100 ppm | 0.02 ppm | Ws$_2$ hybrids | 200 °C |
| 11 | 2389 @ 50 ppm | 26.8 | 10-100 ppm | 17 ppb * | PbS CQD | 135 °C |
| 12 | 38.4 @ 100 ppm | 0.384 | 0.05-100 ppm | 0.05 ppm | α-Fe$_2$O$_3$ | RT |
| 13 | ~2.30 @ 10 ppm | 0.23 | 0.2-10 ppm | ~0.2 ppm | NiO-WO$_3$ | RT |
| 14 | 4120 @ 50 ppm | 82.4 | 50-500 ppm | 50 ppm | MoO$_3$-rGO | 160 °C |
| 15 | 0.05 @ 1 ppm | 0.05 | 1-10 ppm | 1 ppm | PAni-PEO | RT |
| 16 | ~1.2 @ 10 ppm | 0.12 | 1-70 ppm | 1 ppm | CuO/In$_2$O$_3$ | 200 °C |
| 17 | 0.0009 @ 1 ppm | 0.0009 | 0.1-100 ppm | 0.005 ppm* | fum-fcu-MOF | RT |
| 18 | ~1 @ 5 ppm | 1 | 5-150 ppm | 5 ppm | Co$_3$O$_4$-SWCNT | 250 °C |
| this work | 724.45 @ 1 ppm | 725 | 0.01-5 ppm | 0.01 ppm | Silver | RT |

FIG. 17

MULTI-GAS DETECTION WITH CS-FET ARRAYS FOR FOOD QUALITY ASSESSMENT

CROSS REFERENCE TO RELATED APPLICATIONS

This application is a national stage application, filed under 35 U.S.C. 371, of International Patent Application No. PCT/US20/67586, filed on Dec. 30, 2020, which claims priority to U.S. Provisional Patent Application Ser. No. 62/955,097, filed Dec. 30, 2019, which is herein incorporated by reference in its entirety.

FIELD OF THE INVENTION

The present disclosure relates generally to chemical-sensitive field effect transistors (CSFET) sensor arrays for multiple gas detection for food quality assessment and methods for producing the same.

BACKGROUND

Gas detection can be used to monitor various industrial processes, such as manufacturing, agriculture, warehousing, and the like. Various types of sensors can be used for gas detection, such as resistance-based sensors, capacitance-based sensors, electrochemical-based sensors, mass-sensitive sensors, and the like. However, these types of sensors are not cost, power, and size effective.

Gas detection can be used to monitor food quality. For example, food is transported around the world. The quality of the food can be monitored to ensure that the food has not spoiled during transportation and prevent people from getting sick from eating spoiled food.

SUMMARY

According to aspects illustrated herein, there is provided a multi-gas sensor and a method of forming the same. One disclosed feature of the embodiments is a multi-gas sensor, comprising a silicon substrate and a plurality of chemical sensitive field effect transistor (CSFET) sensors formed on a surface of the silicon substrate, wherein each one of the plurality of CSFET sensors are decorated with a different material to detect a different gas associated with food spoilage.

In another aspect, the present disclosure provides a method comprising providing a silicon substrate, oxidizing the silicon substrate to grow an insulation layer, patterning a plurality of chemical sensitive field effect transistor (CSFET) sensors on a surface of the silicon substrate, and depositing a different material on each one of the plurality of CSFET sensors to detect a different gas associated with food spoilage.

BRIEF DESCRIPTION OF THE DRAWINGS

The teaching of the present disclosure can be readily understood by considering the following detailed description in conjunction with the accompanying drawings, in which:

FIG. 2 illustrates an example block diagram of a multi-gas sensor that includes CSFET sensors for autonomous food spoilage detection systems of the present disclosure;

FIG. 3 illustrates an example circuit diagram of the multi-gas sensor of the present disclosure;

FIG. 16 illustrate an example table of comparison of $NH_3$ CSFET with recently reported ammonia sensors of the present disclosure; and FIG. 17 illustrates an example table of comparison of $H_2S$ CSFET with recently reported ammonia sensors of the present disclosure.

To facilitate understanding, identical reference numerals have been used, where possible, to designate identical elements that are common to the figures.

DETAILED DESCRIPTION

The present disclosure provides multi-gas CSFET or multi-material decorated CSFET sensors. The multi-gas CSFET sensor may be used to detect different gases to detect food spoilage. The materials placed on the multi-gas CSFET sensor may be based on the types of gases emitted from a type of food to detect spoilage. Although the examples described herein discuss certain materials used to detect certain types of gases, it should be noted that the multi-gas CSFET sensor can use any types of materials that are compatible with the CSFET fabrication process and sensitive to particular gases that can be emitted by different foods and that are to be detected.

Multiplexed gas detection at room temperature can be used for practical applications, such as for tracking the complex chemical environments associated with food decomposition and spoilage. Trace-level gas detection can be used for safety and quality monitoring in various industrial processes such as manufacturing, agriculture, warehousing, etc. Advanced gas sensors with robust sensing performance, minimal power consumption, miniaturized size, and scalable production can improve the trace-level gas detection for the example applications noted above.

Sensors based on various operating principles have been investigated for trace-level gas detection in the past decades, including resistance-based, capacitance-based, electrochemical-based, and mass-sensitive sensors, but few of these have been demonstrated to be cost, power, and size effective. For instance, the widely commercialized resistance-based metal oxide sensors must typically be operated at high temperatures to enable the adsorption interactions required for transduction. This results in higher power consumption as operation temperatures must be adjusted by a built-in heater.

While other efforts have focused on the optimization of sensing materials and sensor structure, the resulting devices remain far from being practically applicable due to their limited detection sensitivity and poor reproducibility under mass fabrication. Therefore, effective gas sensing systems with minimal baseline drift, good selectivity, low hysteresis and the ability to simultaneously measure multiple gases still need to be developed.

The present disclosure is related to an integrated array of multiple silicon-based, chemical-sensitive field effect transistors (CSFETs) to realize selective, sensitive, and simultaneous measurement of gases typically associated with food spoilage. The silicon transistor-based sensors described by the present disclosure that can overcome the shortcomings of previous sensor designs. For example, the multi-gas CSFET sensors of the present disclosure overcome the size limitations of previous designs, provide low power sensing, and provide high sensitivity, making them useful for trace level gas sensing applications used in food freshness monitoring.

Figure 1:
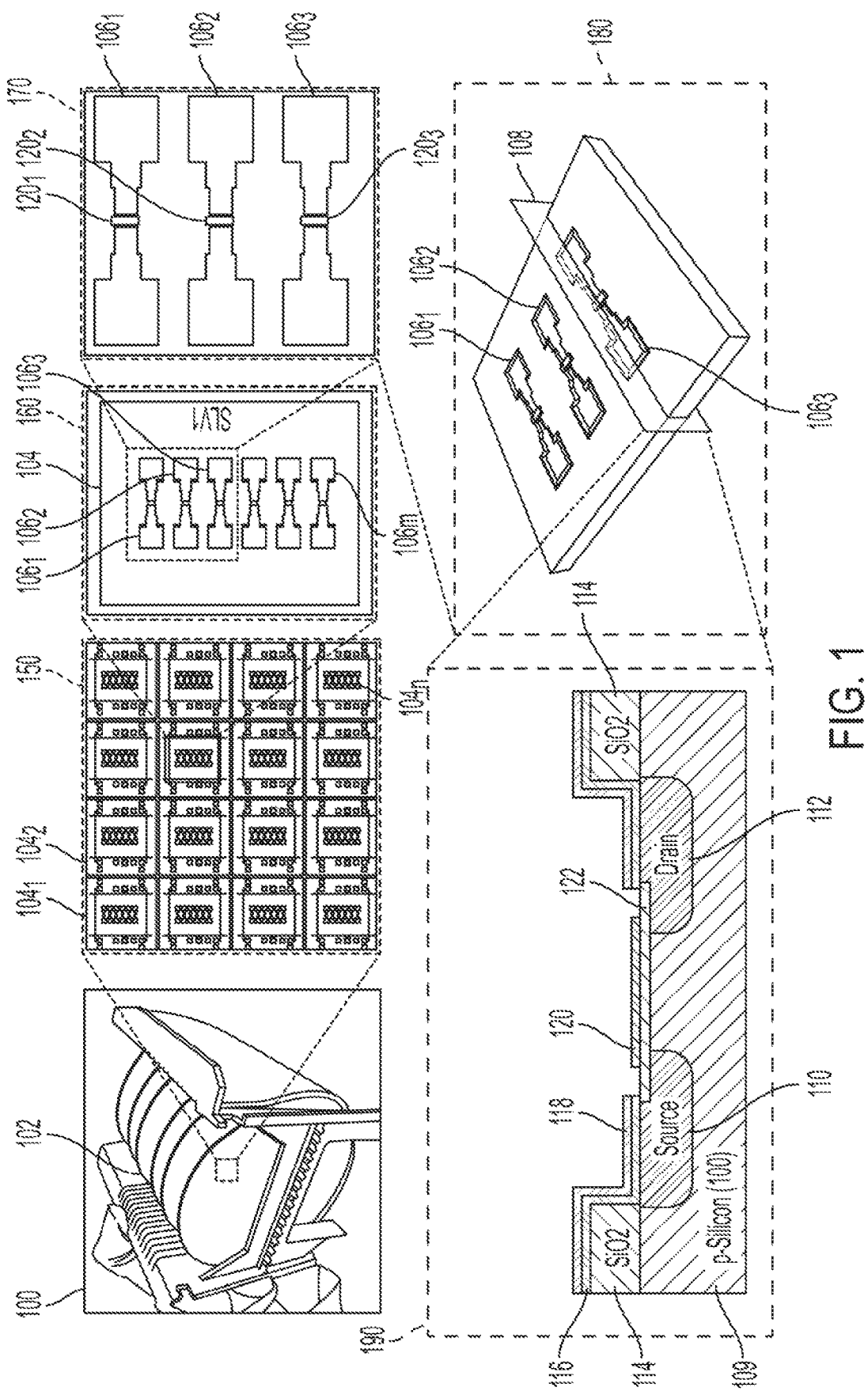
FIG. 1 illustrates example views of a device structure of CSFETs and a multi-gas sensor of the present disclosure.

FIG. 1 illustrates various views of a multi-gas sensor of the present disclosure. The multi-gas sensor may be fabricated on silicon wafers 102 shown in view 100 using semiconductor processing techniques. Any sized wafer 102 may be used (e.g., 4 inch wafers, 6 inch wafers, 12 inch wafers, and the like). View 150 illustrates a zoomed in view of a wafer 102 that shows an array of multi-gas sensors $104_1$ to $104_n$ (hereinafter individually referred to as a "multi-gas sensor 104" or collectively referred to as "multi-gas sensors 104") that can be fabricated on a single wafer 102.

View 160 illustrates a zoomed in view of a single multi-gas sensor 104. Each multi-gas sensor 104 may include a plurality of CSFET based sensors $106_1$ to $106_m$ (hereinafter individually referred to as a "CSFET based sensor 106" or collectively referred to as CSFET based sensors 106"). The CSFET based sensors 106 may be fabricated along a line to form a sensor array covering 400 µm×450 µm. View 170 illustrates a zoomed in view of the CSFET based sensors $106_1$ to $106_3$ that shows different sensing materials $120_1$ to $120_3$ (hereinafter individually referred to as a "sensing material 120" or collectively referred to as "sensing materials 120") that are deposited on each CSFET based sensor $106_1$ to $106_3$ to detect different gases.

Figure 4:
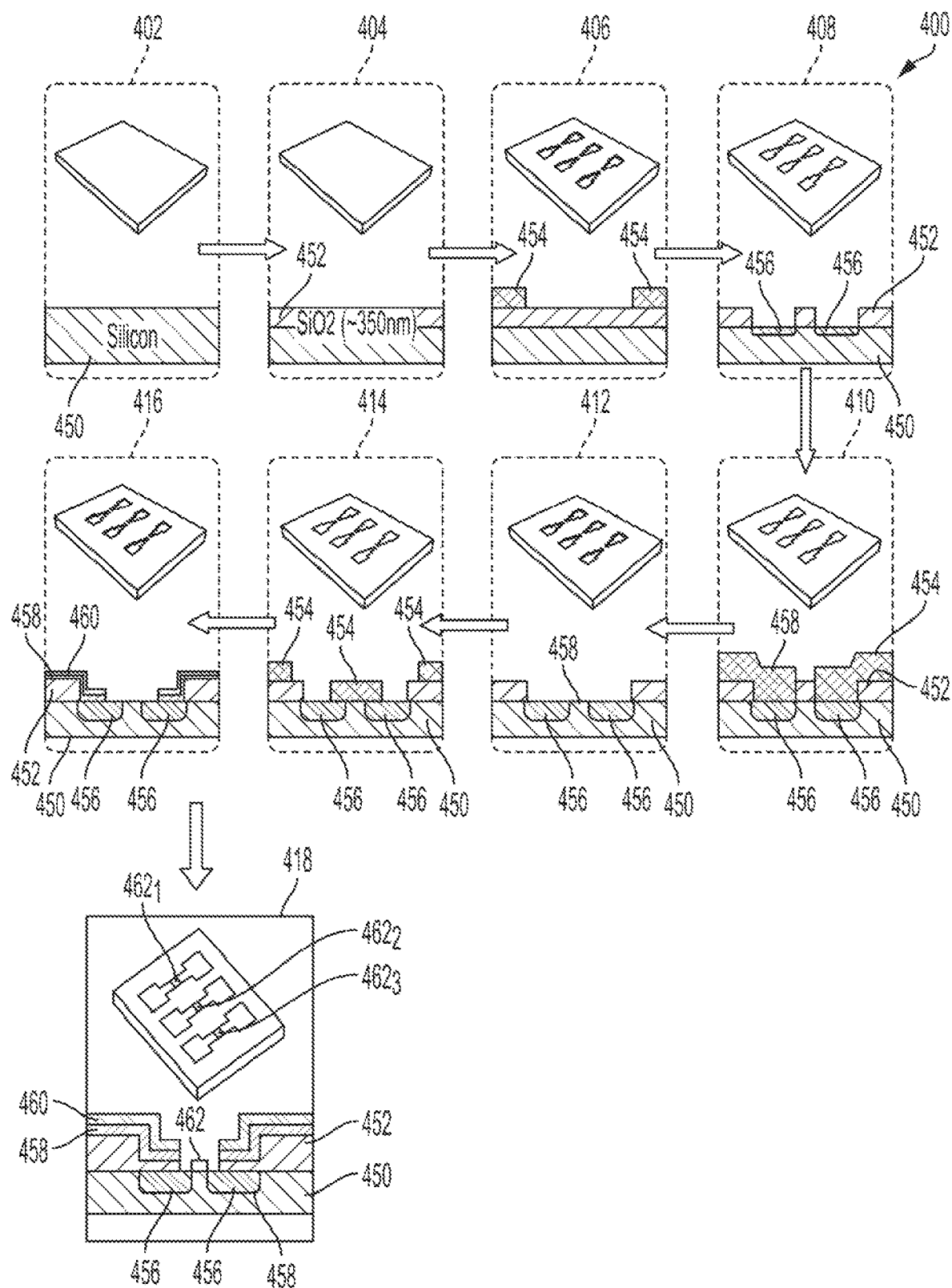
FIG. 4 illustrates an example fabrication process of the multi-gas detection CSFET of the present disclosure.

View 180 illustrates an isometric view of the multi-gas sensor 104. View 190 illustrates a cross-sectional view of the multi-gas sensor 104 cut along a plane 108 illustrated in the view 180. In an example, the view 190 illustrates the structure of the multi-gas sensor 104. In an example, the multi-gas sensor 104 may be built on a silicon substrate 109. The multi-gas sensor 104 may include a source 110 and a drain 112. The multi-gas sensor 104 may include an insulation layer 114, contacts 116 and 118, a native silicon oxide layer 122, and a sensing material 120. The fabrication of each one of these layers on the silicon substrate 109 is illustrated in FIG. 4, and discussed in further details below.

As discussed in further details below, the sensing material 120 may be a function of a type of gas that is to be detected. However, the multi-gas sensor 104 may include different sensing materials 120 on different CSFET based sensors to detect different gases simultaneously on a single multi-gas sensor 104 to assess food quality or food spoilage.

In one example, the sensing materials 120 may be based on ruthenium (Ru), silver (Ag), and silicon oxide ($SiO_3$) to obtain stable room-temperature responses to ammonia ($NH_3$), hydrogen sulfide ($H_2S$), and humidity, respectively. For example, one multi-gas sensor 104 signal changes from its baseline by 13.34 in response to 1 ppm of $NH_3$, 724.45 under 1 ppm $H_2S$, and 23.46 under 80% relative humidity (RH), with sensitive detection down to 10 ppb of $NH_3$ and $H_2S$. However, it should be noted that the materials used in the CSFET may be a function of the desired gases to be detected. In other words, if other gases other than $NH_3$, $H_2S$, and $H_2O$ are to be detected, then other materials can be used that are sensitive to the desired gases to be detected.

In an example, electrically floating, thin film Ru, Ag, and $SiO_x$ constitute as chemical gates of CSFETs to impart sensitivity towards $NH_3$, $H_2S$, and $H_2O$ respectively. Compared with similar sensor topologies reported in literature, these CSFETs demonstrate stable sensing performances with superior sensitivity and ultra-low detection limits, as well as minimal hysteresis, excellent selectivity, and negligible cross-sensitivity as shown in the tables of data illustrated in FIGS. 16 and 17.

In one example, the multi-gas sensor 104 may be combined with a custom printed circuit board into a compact, fully-integrated, and portable system to conduct real-time monitoring of gases generated by decomposing food. FIG. 2 illustrates a block diagram of an example multi-gas sensor device 200 of the present disclosure. The multi-gas sensor device 200 may include the multi-gas sensor 104, a differential pulse voltammetry (DPV) measurement circuit 202, and a communication interface 204 to connect to a computing device 206.

In one example, the communication interface 204 may be a universal serial bus (USB) connector that can connect to a corresponding USB interface on the computing device 206. The multi-gas sensor device 200 may be powered via the connection to the computing device 206 with the communication interface 204 (e.g., a USB connection). In an example, the communication interface 204 may support current up to 500 milliamps (mA).

In one example, the communication DPV measurement circuit 202 may include three major parts: power, signal conditioning, and transmission. In an example, the DPV circuit 202 may include a plurality of transimpedance amplifiers $214_1$ to $214_3$ (hereinafter individually referred to as a "transimpedance amplifier 214" or collectively referred to as "transimpedance amplifiers 214"). Each CSFET based sensor 106 may be communicatively coupled to one of the transimpedance amplifiers 214. For example, the CSFET based sensor $106_1$ may be connected to the transimpedance amplifier $214_1$, the CSFET based sensor $106_2$ may be connected to the transimpedance amplifier $214_2$, and the CSFET based sensor $106_3$ may be connected to the transimpedance amplifier $214_3$. In one example, the transimpedance amplifiers 214 may comprise an LT1006 (Linear Technology) single supply operation amplifier accompanied with a resistor. The transimpedance amplifiers 214 may convert the current signal received from the respective CSFET based sensor 106 into a voltage signal.

In one embodiment, the DPV measurement circuit 202 may include a microcontroller 208. The microcontroller 208 may include an analog to digital converter (ADC) 210 and a low pass filter 212.

Figure 8:
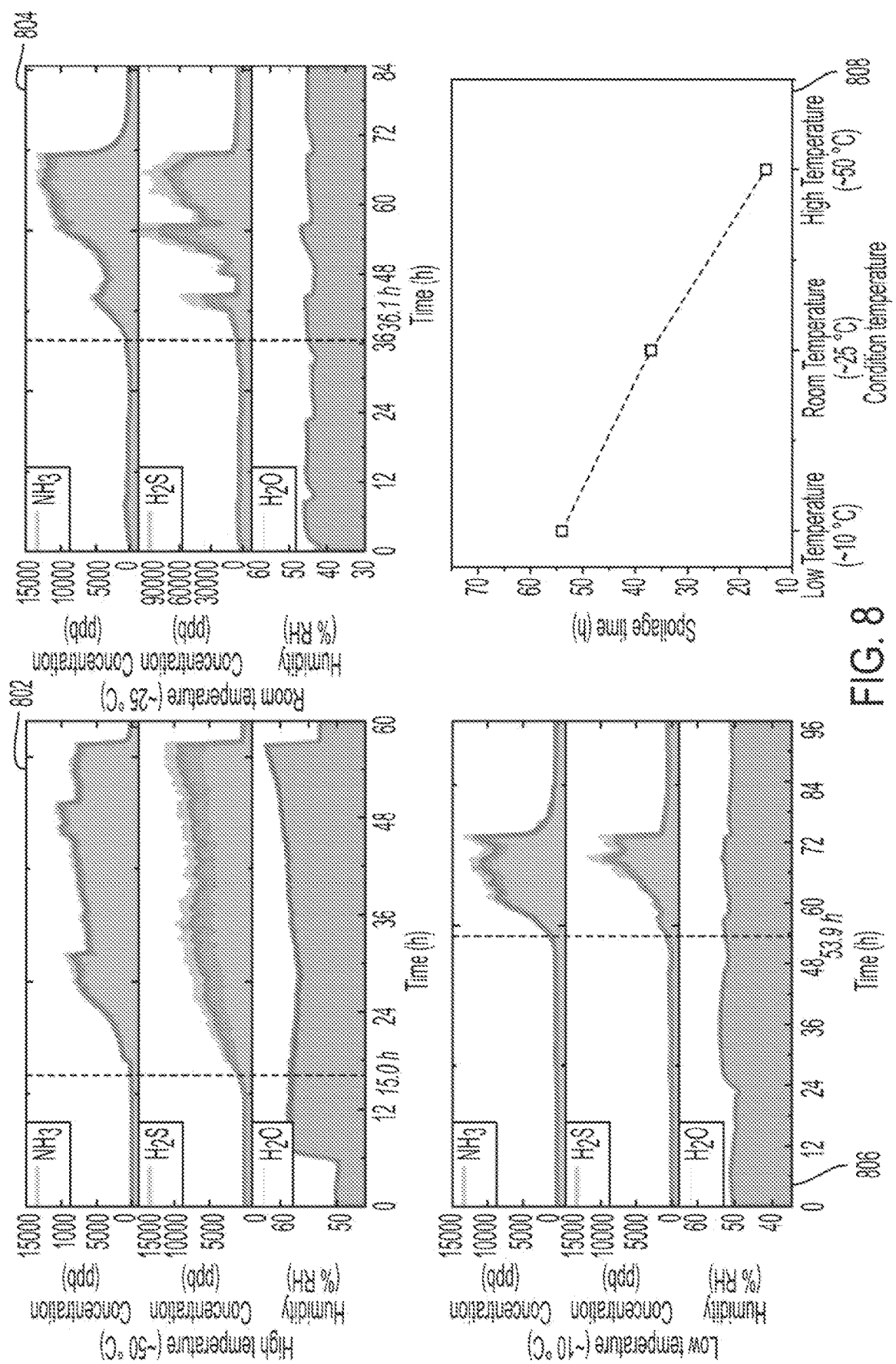
FIG. 8 illustrates an example of pork belly spoilage tracking over varying food storage temperatures using the multi-gas detection CSFETs of the present disclosure.

FIG. 3 illustrates an example circuit diagram 300 of the DPV measurement circuit 202. In one embodiment, the DPV measurement circuit 202 may also include a voltage generator 302. In order to maintain the full measuring range of the microcontroller's analog to digital converters (ADC) 210, the voltage generator 302 may be a negative voltage generator based on NE555 timer (Texas Instruments Inc.) that biases the source of the CSFET based sensors 106 in a negative voltage while a positive input of the respective transimpedance amplifiers 214 (e.g., the LT1006) is connected to ground. After this, the voltage signal was fed into the ADC 210 of the microcontroller 208 (e.g., a SAM D21 Cortex-M0+ (32-bits ARM) (Microchip Technology)) and the pre-programmed infinite impulse response (IIR) low pass filter (LPF) 212 may be used to denoise the signal as shown in the signal conditioning diagram (e.g., see chart 808 in FIG. 8). The microcontroller 208 can be programmed on-board by Joint Test Action Group (JTAG) programmer or USB after burning a bootloader into it. The microcontroller 208 sends processed data to the computing device 206 via the communication interface 204 (e.g., a USB connection).

The developed multi-gas sensor 104 may be integrated with a custom-designed PCB to build a portable and autonomous CSFET sensor system for multiplexed, trace-level gas detection (e.g., the multi-gas sensor deice 200). This device 200 can be integrated into smart refrigerators, providing food quality insights that could allow producers and consumers to both identify unsafe items and reduce food waste. In the present disclosure, the system is demonstrated for continuous, real-time monitoring of egg and pork belly spoilage at different storage temperatures. Significant sensor signal changes, especially towards $H_2S$, were detected before and during the spoilage process of the specific food items. Furthermore, the onset of food spoilage was seen to decrease with increasing temperature as expected, confirming the reliability of this system for food quality assessment. Thus, the devices described herein can pave the way towards trace-level multi-gas detection for ubiquitous food quality monitoring.

FIG. 4 illustrates an example method 400 of how the multi-gas sensor 104 may be fabricated. By using existing silicon-based manufacturing methodologies, this room-temperature gas sensing array can be reproduced at low cost, making it an attractive platform for ambient gas measurement needed in food safety applications.

The bare CSFET may be fabricated via a silicon complementary metal oxide semiconductor (CMOS) processing as shown in FIG. 4. At block 402 a silicon substrate 450 may be provided. At block 404, the silicon substrate 450 may be subjected to a three-step dry (e.g., 5 minutes (min))-wet (55 min)-dry (5 min) oxidation process at 1000° C., atmospheric pressure, in order to thermally grow silicon dioxide as an insulation layer 452. The insulation layer 452 may be grown to approximately 350 nanometers (nm).

At block 406, a photolithography process may be applied to pattern a photoresist 454. The photoresist 454 may be patterned to expose a portion of the insulation layer 452 that will include a source and drain region.

At block 408, the source and drain regions 456 may be formed with a wet etching process using 5:1 buffered hydrofluoric acid for 5 min. The source and drain regions 456 may be doped by ion implantation ($4.5e^{14}$ $cm^{-2}$, Phosphorus, 15 kiloelectron volts (KeV)) and activated by rapid thermal annealing (RTA) at 1050° C. for 30 s in $N_2$ to form the $n^{++}$ doped regions. The photoresist layer 454 may be removed.

At block 410, a photoresist layer 454 may be deposited to perform another photolithography process. The photoresist layer 454 may be patterned to form a channel region.

At block 412, a channel region 458 may be formed. For example, the insulation layer 452 on the channel region 458 may be removed by etching and then doped (similar to the process used to form the source and drain regions 456 in block 408). However, the channel region 458 may be formed by doping at different parameters (e.g., $5e^{11}$ $cm^{-2}$, Phosphorus, 18 KeV). The channel region becomes $n^-$ after RTA at 900° C. for 1 second (s) in $N_2$.

At block 414 another layer of photoresist 454 may be applied to perform another photolithography process. The photoresist 454 may be patterned to protect the channel region 458 for the contacts that will be deposited.

At block 416, contact layers 458 and 460 may be deposited via a sputtering process. The contact layer 458 may be nickel (Ni) and formed to be approximately 20 nm thick. The contact layer 460 may be tungsten (W) and formed to be approximately 50 nm thick. The contact layers 458 and 460 may be formed followed with lifting-off in acetone. To obtain ohmic contact, the as-prepared wafer maybe annealed by RTA at 420° C. for 5 min in forming gas to form nickel silicidation (NiSi).

At block 418, a sensing material $462_1$-$462_3$ (hereinafter individually referred to as a "sensing material 462" or collectively referred to as "sensing materials 462") may be deposited on the channel region 458. As noted above, different CSFET based sensors 106 may be decorated with different sensing materials 462 based on the gas the CSFET based sensor 106 is to detect.

The different sensing materials may include Ru, Ag, and $SiO_x$. The different sensing materials 462 may be deposited on the channel region 458 by evaporation (Ru: e-beam, 0.1 Å/s, 1 nm; Ag: thermal, 0.1 Å/s, 1 nm; $SiO_x$: e-beam, 2 Å/s, 3 nm). For the $NH_3$ and $H_2S$ sensing materials 462, in order to reduce the response of native oxide to humidity, the surface of the CSFETs may be treated by $O_2$ plasma and trichloro (1H,1H,2H,2H-perfluorooctyl) silane (Sigma Aldrich, 97%) vapor successively before evaporation. Finally, the decorated channel regions 458 may be annealed in forming gas at 150° C. for 1 hour (h). In one example, in order to keep CSFETs "on" after decoration with functional materials, their channels were lightly n-doped to reduce the initial threshold voltage ($V_{th}$) of the underlying transistors.

Individual CSFET based sensors 106 of the multi-gas sensor 104 were decorated with different functional sensing materials to be selective towards different target gases. Due to the specific interactions of Ru—N and Ag—S, Ru and Ag were selected as the sensing materials for the detection of ammonia ($NH_3$) and sulfur ($H_2S$) gases. $SiO_x$ may be selected as the humidity-sensitive sensing material because of its abundant oxygen vacancies formed via rapid deposition. These three materials were successively decorated on the gate of the different CSFET based sensors 106 to functionalize the complete multi-gas sensor 104.

The multi-gas sensor 104 of the present disclosure was tested on high protein foods such. For high-protein foods such as eggs, dairy, and meat, off-gassed $NH_3$ and $H_2S$ serve as quality indicators of freshness. Based on reported data, 10 milliliters (ml) of egg whites produces ~100 micrograms (μg) of $H_2S$ over multiple hours. Until now, sensors using various technologies have been applied for food quality evaluation, such as resistance-type nanowire or nanofiber, colorimetric sensors, and electrochemical sensors. However, after accounting for food storage volume and temperature, this means that the sensor system must be able to identify H$_2$S and NH$_3$ gases with lower than 100 ppb detection limits and negligible cross-sensitivity.

Humidity is another parameter that affects food storage and spoilage, and, thus, should be simultaneously monitored with H$_2$S and NH$_3$. All of these requirements necessitate the deployment of sensors with high selectivity and low detection limits, such as the multi-gas sensor 104 of the present disclosure.

EXAMPLES

Figure 5:
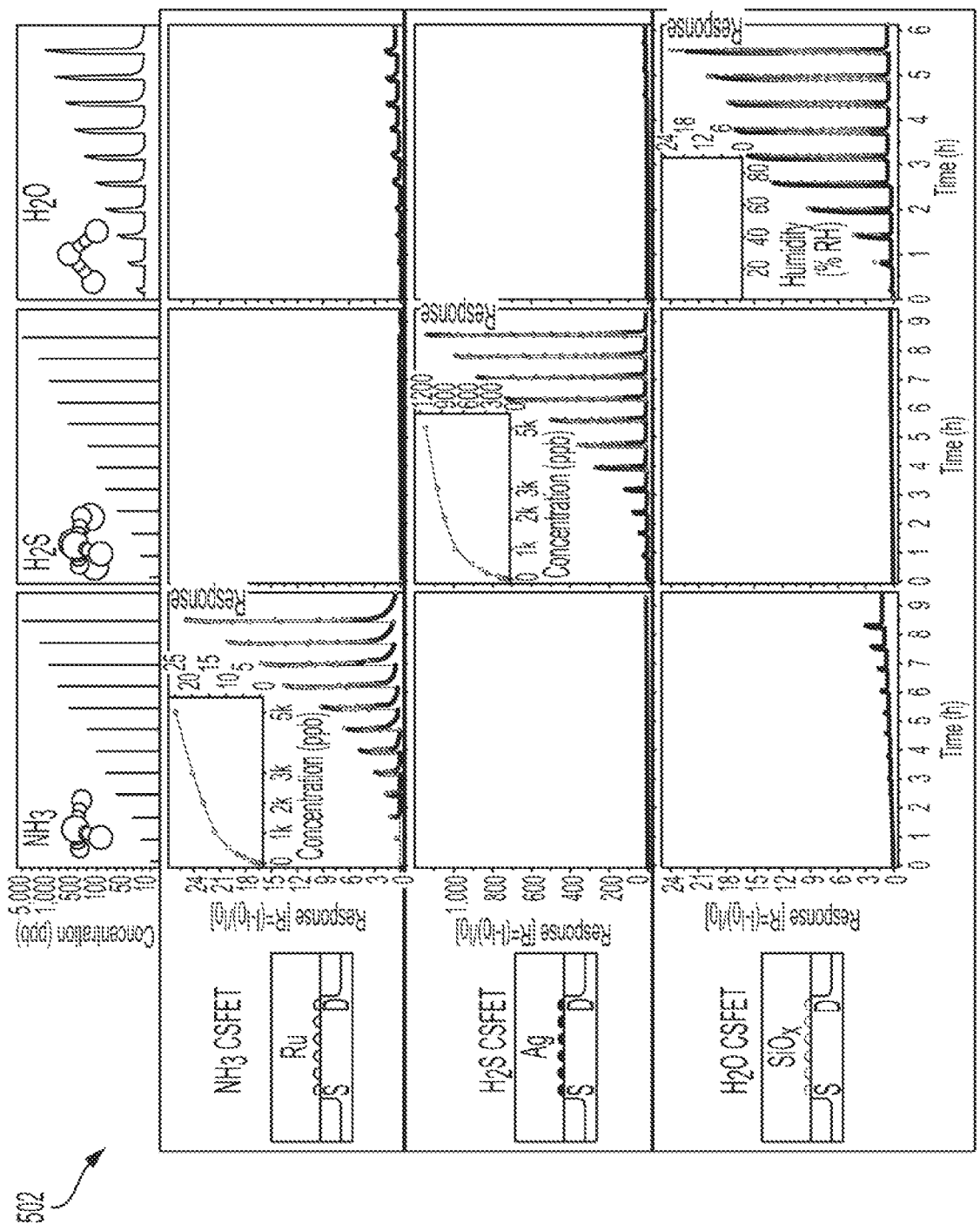
FIG. 5 illustrates example sensing performance of multi-material decorated CSFETs of the present disclosure.

To assess its potential for practical food-safety application, the multi-gas sensor 104 was tested with various levels of NH$_3$, H$_2$S, and humidity to characterize target and cross-sensitivities of each sensor in the array. Graphs 502 shown in FIG. 5 illustrate the results. The sensor response (R) was calculated as R=(I-I$_0$)/I$_0$ where I and I$_0$ is the CSFET measured drain current in the target gas and pure carrier gas respectively. The limit of detection for NH$_3$ and H$_2$S was found to be as low as 10 ppb. Further, the individual sensors in the CSFET array exhibited strong preferential sensitivity towards their target gases compared to the other gases (see e.g., FIG. 5). Specifically, the response of the Ru-decorated CSFET towards NH$_3$ (13.34 at 1 ppm) was 1 to 2 order of magnitude higher than its response towards H$_2$S (0.05 at 1 ppm) and humidity (1.73 at 80% RH). Similarly, the response of the Ag-decorated CSFET (724.45 at 1 ppm for H$_2$S, 0.47 at 1 ppm for NH$_3$, 18.40 at 80% RH for H$_2$O) and the SiO$_x$-decorated CSFET (23.46 at 80% RH for H$_2$O, 0.83 at 1 ppm for NH$_3$, 0.03 at 1 ppm for H$_2$S) showed high selectivity towards their respective target gases.

Figure 9:
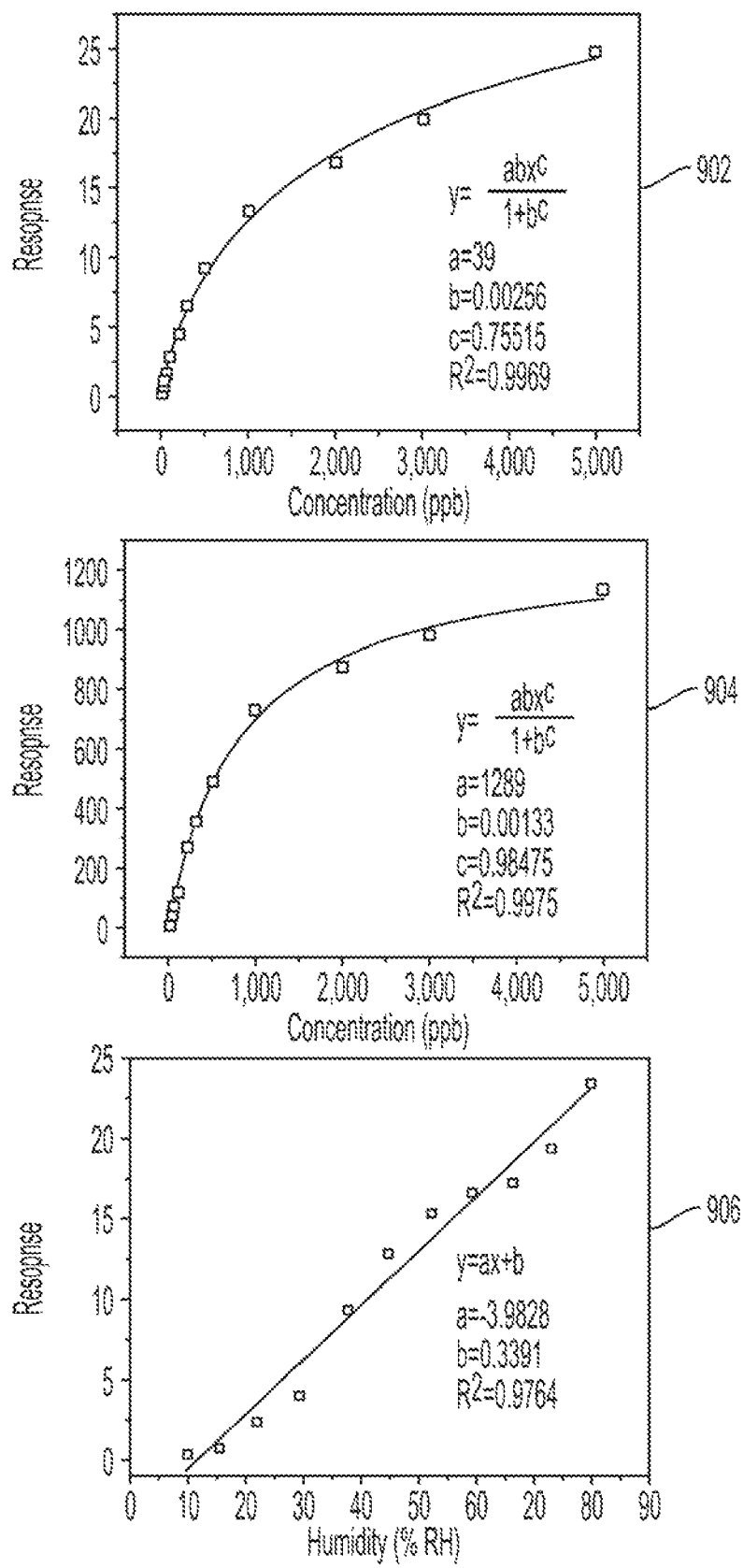
FIG. 9 illustrates examples of response fitting curves for different CSFETS of the present disclosure.
Figure 10:
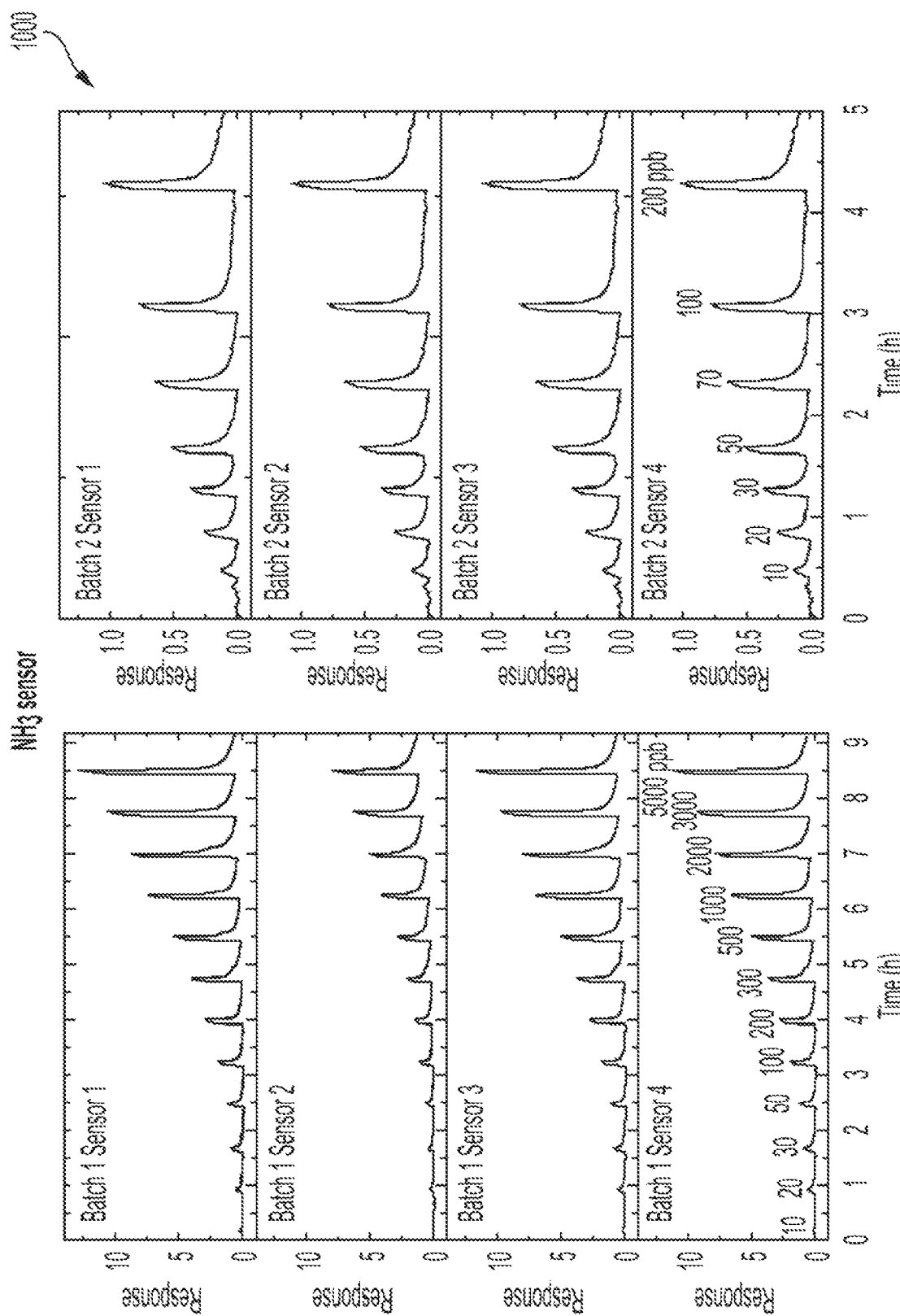
FIG. 10 illustrates device variation of an $NH_3$ gas sensor with different batches and different devices of the present disclosure.
Figure 11:
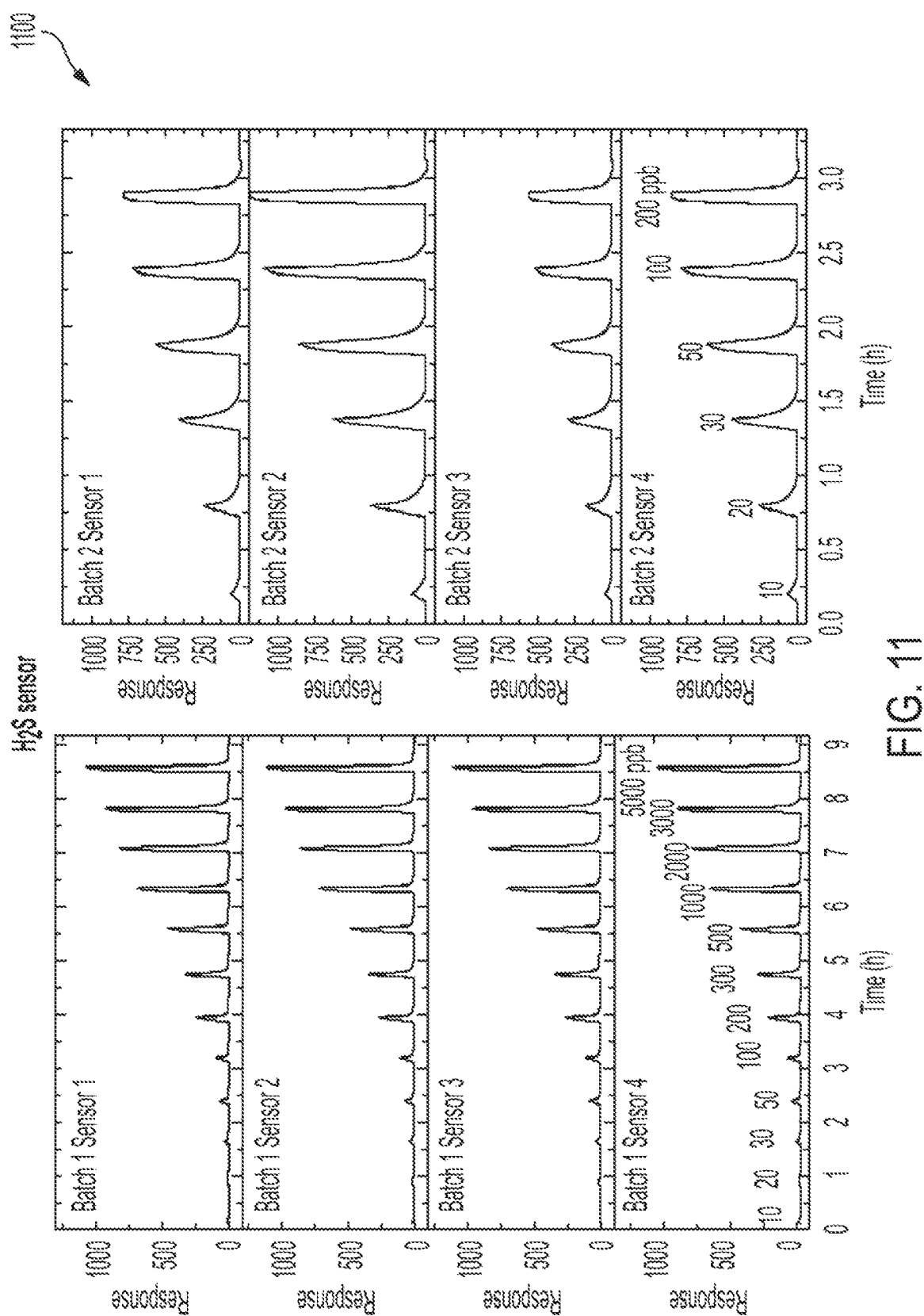
FIG. 11 illustrates device variation of an $H_2S$ gas sensor with different batches and different devices of the present disclosure.
Figure 12:
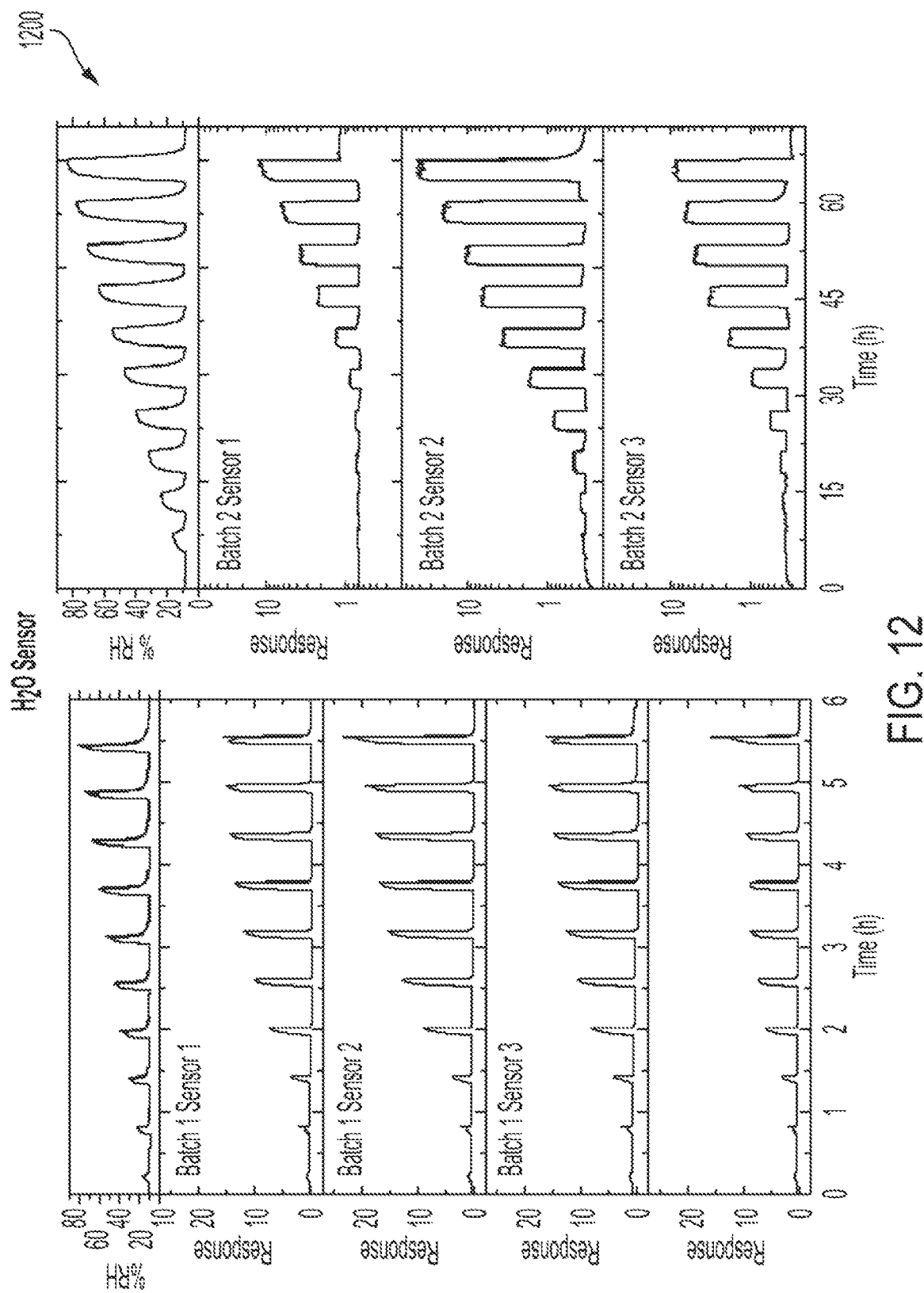
FIG. 12 illustrates device variation of an $H_2O$ gas sensor with different batches and different devices of the present disclosure.

The response fitting curves and parameters 902, 904, and 906 are listed in FIG. 9. Measured responses of other devices from the same wafer and from different batches of fabricated CSFETs are depicted in graphs 1000 shown in FIG. 10, graphs 1100 shown in FIG. 11, and graphs 1200 shown in FIG. 12 to demonstrate reproducibility and the inherent device-to-device variability.

Compared with recently published works, both the NH$_3$ and H$_2$S CSFETs exhibit outstanding sensing performance with superior sensitivity (at least an order of magnitude higher in response per ppm), selectivity and very low limits of detection as shown by the tables 1600 in FIG. 16 and table 1700 in FIG. 17.

Stability and hysteresis of gas sensors are critical considerations for ensuring that measured responses accurately reflect actual concentrations and to eliminate the need for repeated calibration, an important practical consideration for real-world applications. To that end, as indicated in graphs 602 of FIG. 6, all CSFET sensors demonstrate good stability in all tested concentrations. For example, standard deviations in the responses of NH$_3$, H$_2$S, and H$_2$O CSFETs towards 100 ppb pulses of NH$_3$, H$_2$S and 80% RH are 5.2%, 1.5%, and 1.6%, respectively.

Figure 6:
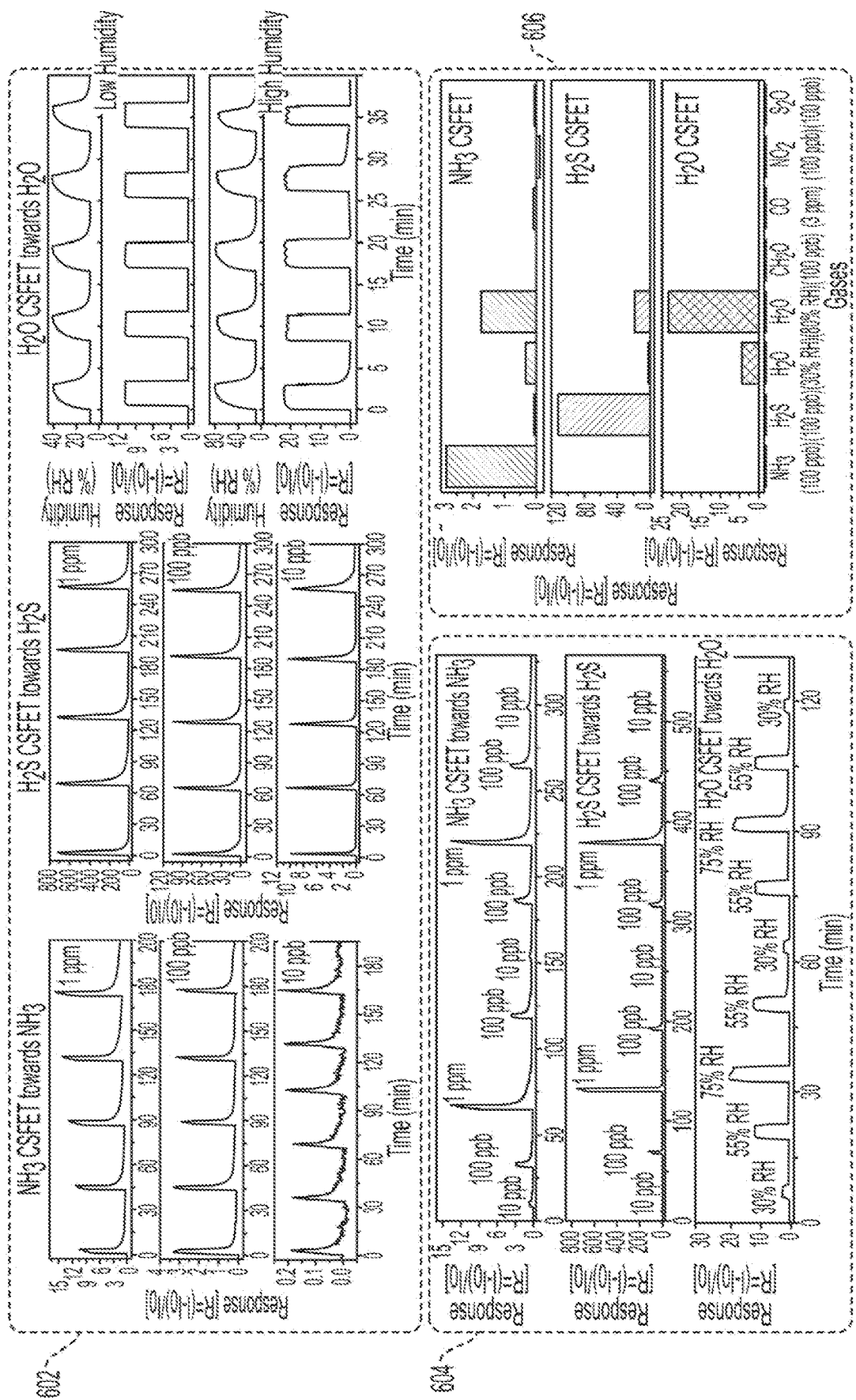
FIG. 6 illustrates example data demonstrating repeatability and hysteresis of CSFETs of the present disclosure.
Figure 13:
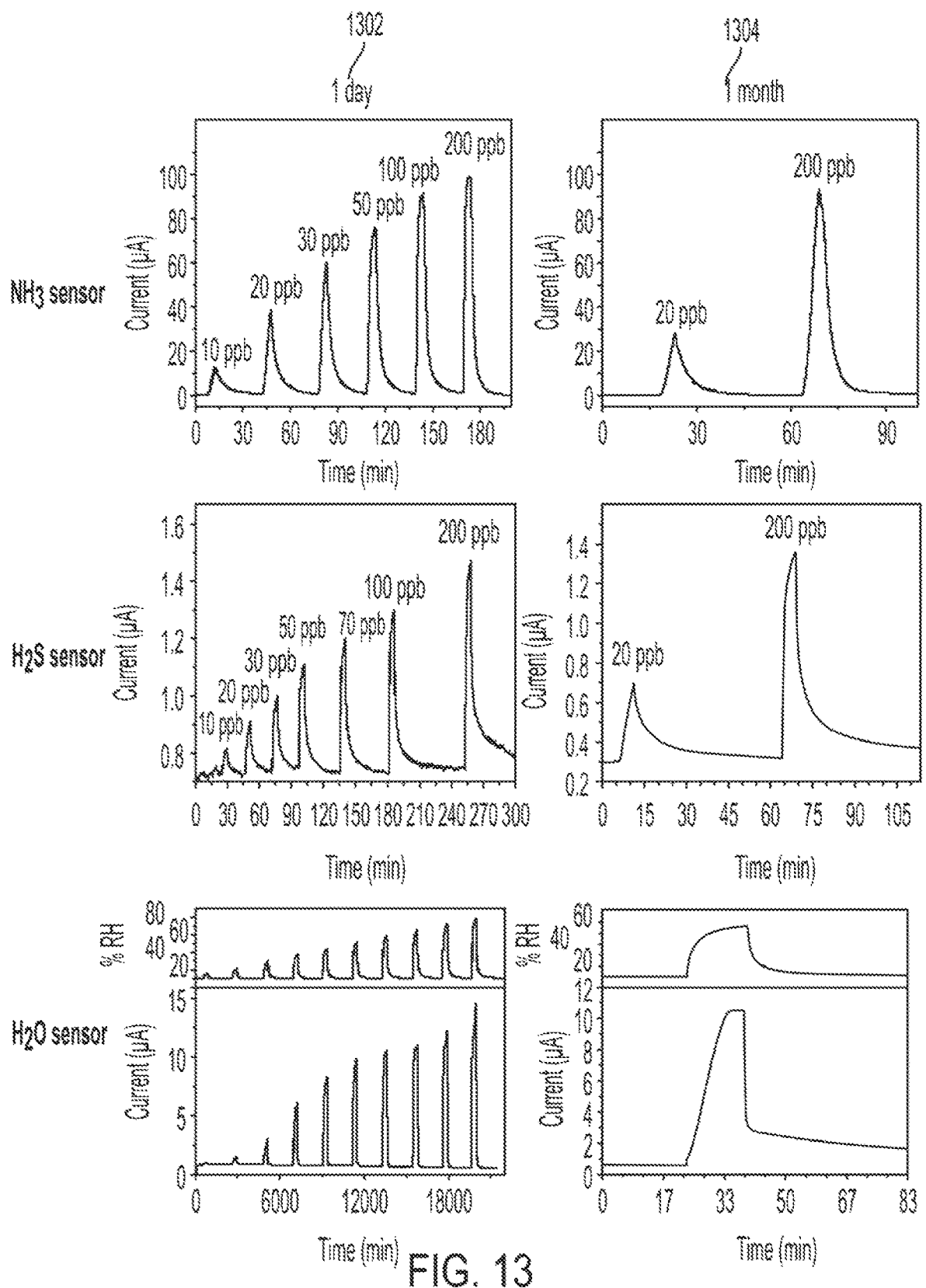
FIG. 13 illustrates example sensor responses after fabrication and after one month of storage at ambient conditions.

The graphs 1302 and 1304 in FIG. 13 show sensor stability over a longer duration, comparing sensor responses after fabrication with sensor responses after storage for a month at ambient conditions. Graph 604 in FIG. 6 shows that the response variation between increasing and decreasing concentration of 100 ppb of NH$_3$, H$_2$S and 55% RH are 15.8% 1.7%, and 1.2%, respectively, indicating low hysteresis. Additionally, the selectivity of the multi-CSFET array against several common air pollutants, namely; CO, SO$_2$, NO$_2$ and CH$_2$O, was tested due to their possible existence in ambient and practical sensing environments. As indicated in graph 606 in FIG. 6, the CSFET sensors show negligible response to these common atmospheric pollutants.

In summary, the multi-gas sensor 104 of the present disclosure demonstrates stable performance with superior sensitivity towards trace-level target gases and negligible cross-sensitivity, showcasing its strong potential application in food spoilage and waste monitoring.

Since NH$_3$, H$_2$S, and humidity are the main constituent gases released from high-protein foods, monitoring their evolution during the spoilage process can be used as a freshness indicator of such food items. To that end, the presented multi-gas sensor 104 can be deployed in a compact, autonomous system (e.g., the multi-gas sensor device 200) for real-time gas detection and data read-out, making it an excellent food spoilage monitoring technology.

Food spoilage tests were performed at different temperatures to verify the relationship between food spoilage time and storage temperature. It is empirically expected that the onset of food spoilage may occur earlier at higher temperatures. By comparing the gas sensor results to this expectation, the performance of the multi-gas sensor device 200 can be verified.

In one embodiment, pork belly and eggs were chosen as representative foods for monitoring freshness and spoilage. The food sample and multi-gas sensor device 200 were put at opposite ends of the storage chamber to minimize the influence of temperature on the gas sensor response. The side with the food sample was kept at a roughly controlled temperature using an ice bag or heater to generate low (~10° C.) or high (~50° C.) temperatures respectively.

In order to accelerate the rotting process, a hole was artificially created in the eggshell of all the tested eggs to expose the egg white. The associated temporal gas concentration curves are shown in graphs 702, 704, 706, and 708 in FIG. 7. To assist comparison, all sensor signals are converted into concentration readings based on the fitting equations shown in FIG. 9.

Figure 7:
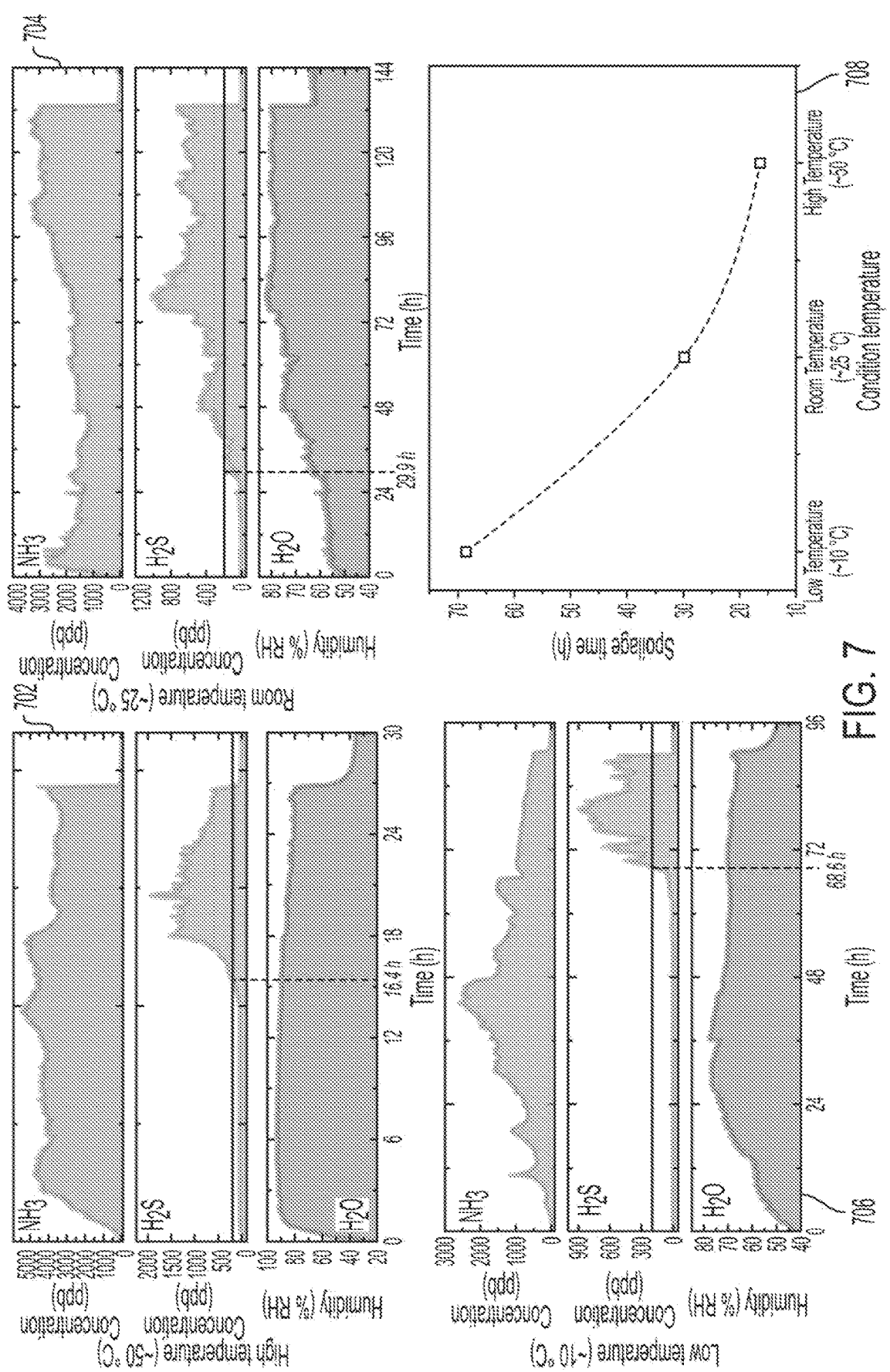
FIG. 7 illustrates an example of egg spoilage tracking over varying food storage temperatures using the multi-gas detection CSFETs of the present disclosure.

As seen in FIG. 7, once the egg was put into the chamber, the NH$_3$ CSFET and H$_2$O CSFET immediately began responding, while the H$_2$S CSFET response remained low. This may be possibly due to early emission of NH$_3$ and H$_2$O that originate from bioactivity of native components or bacteria within the egg. Over time, the concentration of H$_2$S rose prominently, indicating the onset of food spoilage. The NH$_3$ profile does not show a corresponding sudden change as rotting eggs have a predominant sulfide signature. This rotting process continued with all signals gradually levelling off.

Finally, the container was opened to release the gases and all CSFET readings went down to their original baselines, demonstrating the reversibility of this sensor system. By considering the temporal concentration curves of H$_2$S, the time of rapid concentration increase can be regarded as the start of the rotting process with 200 ppb as a threshold indicating spoilage. The rationale for this is as follows: because gas concentrations depend on enclosure volume and sample mass among other features, there is no clear reference for the expected gas concentration at each stage of spoilage.

However, previous research indicates that for degrading protein-rich foods like fish, ppb to low ppm levels can be expected for spoiled food. After accounting for features of our setup, 200 ppb was chosen as a threshold concentration to indicate food spoilage, a cutoff that in the future can be modified to account for different foods or storage conditions. As plotted in graph 708 shown in FIG. 7, the onset of spoiling occurs later at lower temperatures as expected, likely due to decreased activity at lower temperatures of the bacteria that contribute to food degradation. While the exact functional form of this curve could depend on various factors, including the composition of this particular batch of eggs and other environmental considerations, this general increase in onset time with decreasing temperatures is consistent with existing knowledge that cooler environments delay spoilage.

Figure 14:
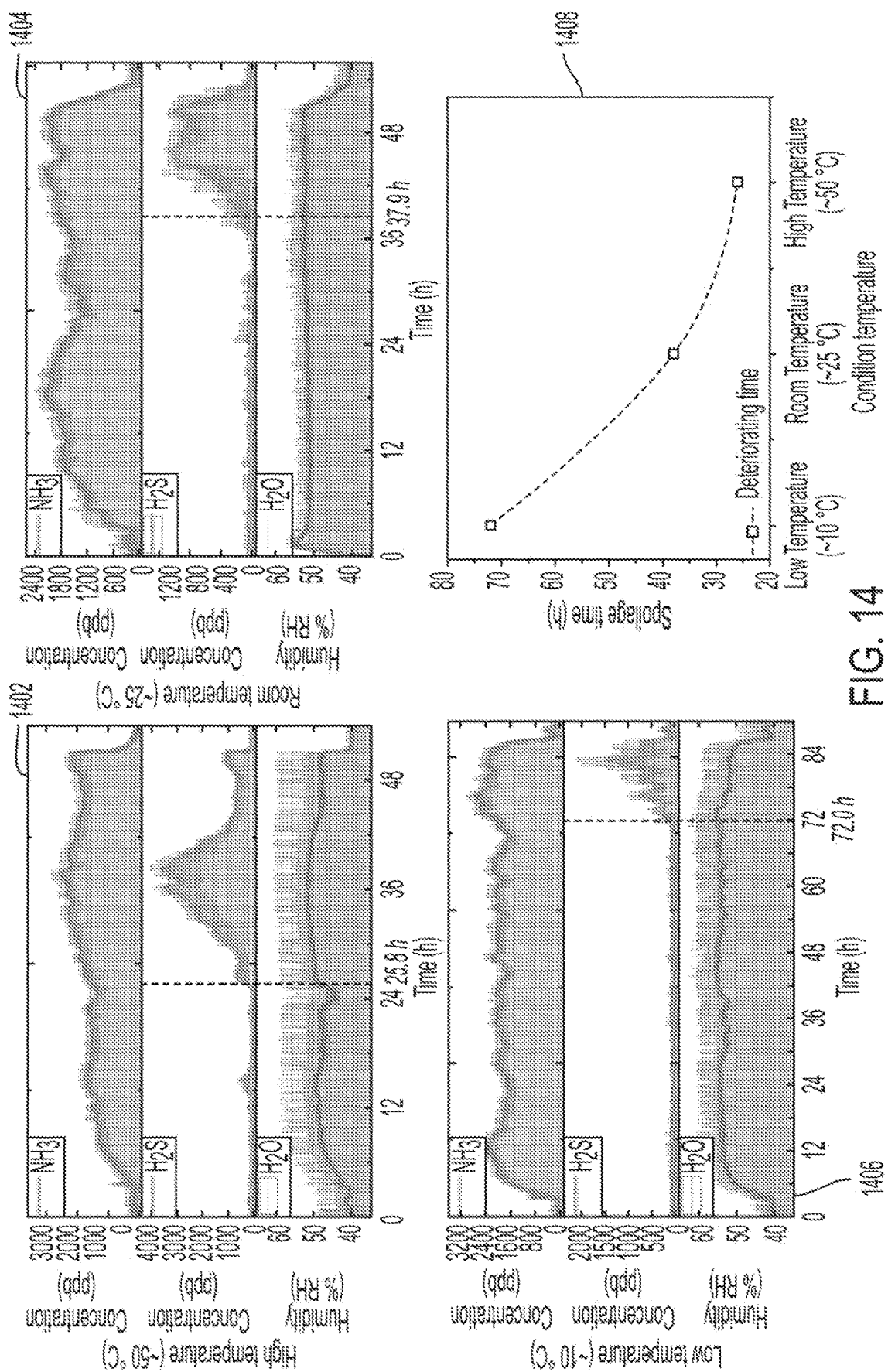
FIG. 14 illustrates an example of egg spoilage tracking over varying food storage temperatures.

To verify that the gas sensing platform consistently shows this trend, this egg spoilage trial is repeated with comparable results. The results are shown in graphs 1402, 1404, 1406, and 1408 in FIG. 14. Note that while the curves in both trials monotonically decrease with temperature, the exact functions differ due to the complex history of the particular food sample, different delivery methods or storage conditions, etc. Therefore, it is not expected that the concentration curves of all food spoilage trials may be identical, and more comprehensive studies may be performed in the future to better interpret gas sensor results. For visual comparison, photos of a progressively spoiling egg in a test tube were captured at different times (0 days, 2 days, 5 days at room temperature) to visually confirm that the egg does indeed rot over the timespan indicated by the gas sensor results.

Figure 15:
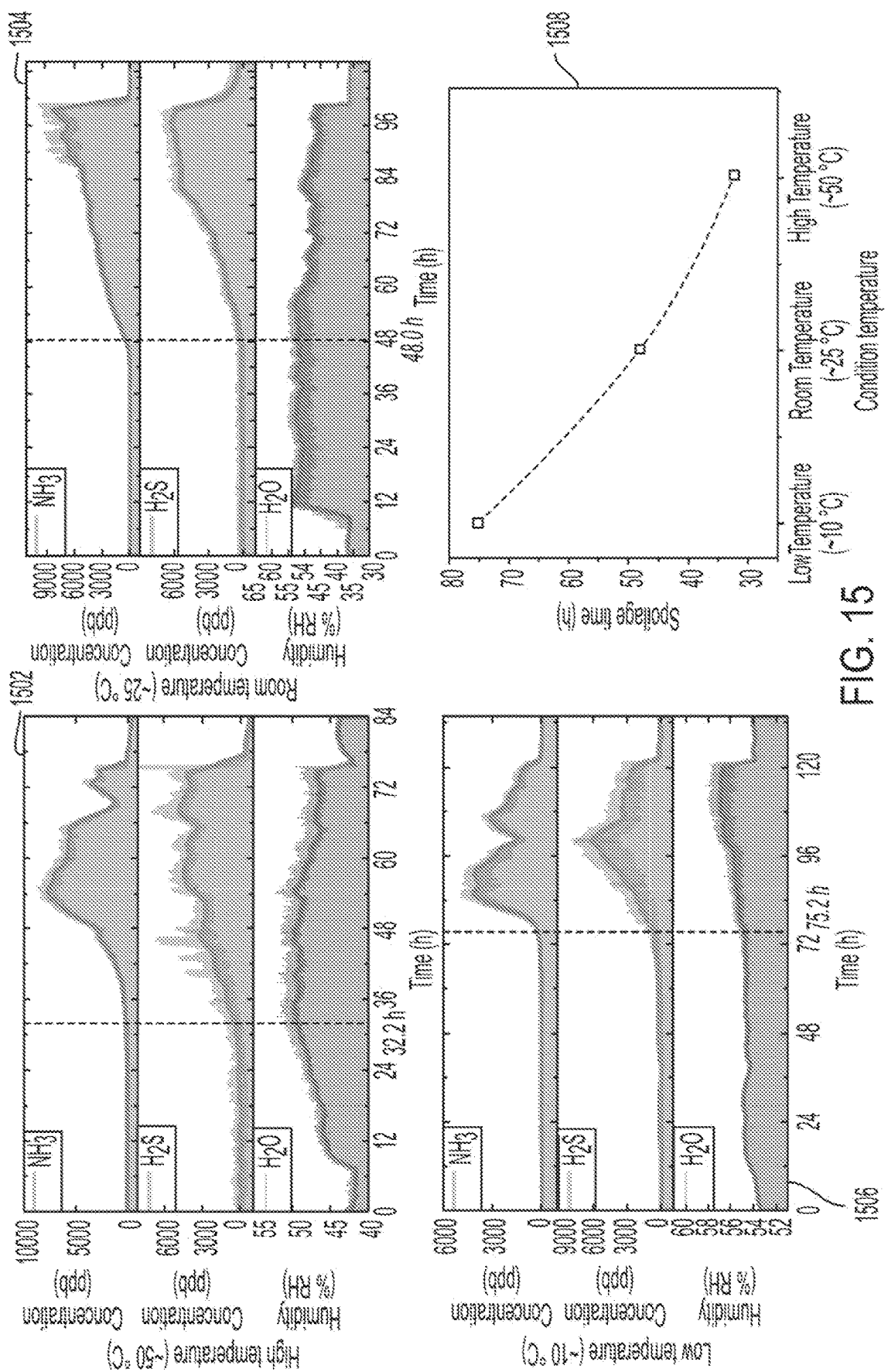
FIG. 15 illustrates an example of pork belly spoilage tracking over varying food storage temperatures.

To further demonstrate this system for food spoilage detection, a similar strategy is applied for the pork belly spoilage test. Pork belly is chosen as it is known to release both ammonia and hydrogen sulfide amongst other gases during rotting, so it is expected that both sulfide and ammonia signatures may be obtained during spoilage. Real-time monitoring of released gases under different temperatures is shown by graphs 802, 804, 806, and 808 illustrated in FIG. 8. Overall, a similar concentration trend is observed compared to the spoiling egg, but with an additional expected increase in ammonia levels during decay. The concentration of $H_2S$ and $NH_3$ gases are higher at higher temperatures, due to higher bacterial colony activity. When the test chamber is opened, the $H_2S$ and $NH_3$ sensors exponentially recover to their original values. Over the duration of the test, the humidity sensor shows a relatively stable response. In the future, more comprehensive spoilage tests may be performed to explain this and more deeply explore when and how certain gas levels elevate. To compare the onset of rotting at different temperatures, 200 ppb is again chosen as the threshold concentration. The time when both $H_2S$ and $NH_3$ sensors reach 200 ppb is extracted and plotted versus temperature in graph 808 shown in FIG. 8. The time to spoilage of the pork belly is lower with higher storage temperature, as expected. To verify this result, the pork belly spoilage trial is repeated with comparable results, as shown by graphs 1502, 1504, 1506, and 1508 in FIG. 15. To visually confirm spoilage, optical images of the pork belly when fresh and then after spoilage were captured and observed, revealing a noticeably duller sample after spoilage. Overall, this demonstration with dynamic egg and pork belly spoilage monitoring highlights the capability of the multi-CSFET array system to quantitatively gauge food freshness. To further develop the utility of this system, more comprehensive food spoilage tests can be conducted and analyzed with statistical methods to identify spoilage thresholds and characteristic spoilage profiles for different foods.

In summary, a high-performance multi-CSFET array for trace-level, multi-gas sensing is presented, and its ability to assess complex gaseous environments for practical applications is demonstrated. Ru, Ag and $SiO_x$ were identified as sensing materials towards $NH_3$, $H_2S$, and humidity respectively, and were independently functionalized on the gates of three CSFET units. The resulting sensors demonstrate superior sensitivity, low limit of detection, and minimal hysteresis towards their target gases with negligible cross-sensitivity and baseline drift. The multi-CSFET array was integrated with custom PCB and circuitry to conduct proof-of-concept measurements of food spoilage. Overall, the CSFET sensor arrays demonstrate high performance for trace-level gas sensing, can be manufactured reliably and at low cost with traditional silicon processing, and can be robustly integrated with compact circuitry to enable convenient and autonomous gas measurements in ambient conditions. In closing, beyond food spoilage monitoring, the presented multi-CSFET array system also has broad prospects in practical applications such as in health, safety, and air quality monitoring, due its portability and durability.

All gas-sensing experiments, including food spoilage tests, were conducted in a walk-in fume hood. CSFET array chips were bonded with a 28-pin J-bend leaded chip carrier. For standard gas tests, the current signals were acquired by a LabVIEW-controlled data acquisition unit (National Instruments, NI USB-6259). A Keithley 428 current amplifier was used to bias the CSFET. The testing gas was produced by mixing synthetic air-diluted standard gases (MESA International Technologies Inc.) with house-compressed dry air at a calibrated concentration through mass flow controllers (Alicat Scientific Inc.). The typical flow rate of target gases and carrier gas was 1~100 sccm and 1 slm. The humidity was generated by two mass flow controllers, one of which was connected with a bubbler and condenser to produce moisture. The humidity was monitored by a commercial humidity sensor (Sensirion AG, model SHT2x). The current characteristics for validation were measured by Keysight 4155C semiconductor parameter analyzer.

In the food spoilage tests, current was acquired by DAQ (National Instruments, NI USB-6259) with Keithley 428 current amplifier or a portable sensor system as follows. The egg spoilage data as shown in the graph 704 of FIG. 7 is acquired by portable device to demonstrate the properties of portable sensor system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multi-gas sensor, comprising:
   a silicon substrate; and
   a plurality of chemical sensitive field effect transistor (CSFET) sensors formed on a surface of the silicon substrate, wherein each one of the plurality of CSFET sensors is decorated with a different material to detect a different gas associated with food spoilage, wherein a first CSFET sensor of the plurality of CSFET sensors is decorated with ruthenium (Ru) to detect ammonia ($NH_3$).

2. The multi-gas sensor of claim 1, wherein a second CSFET sensor of the plurality of CSFET sensors is decorated with silver (Ag) to detect sulfur ($H_2S$).

3. A multi-gas sensor, comprising:
   a silicon substrate; and
   a plurality of chemical sensitive field effect transistor (CSFET) sensors formed on a surface of the silicon substrate, wherein each one of the plurality of CSFET sensors is decorated with a different material to detect a different gas associated with food spoilage, wherein a first CSFET sensor of the plurality of CSFET sensors is decorated with silicon oxide ($SiO_x$) to detect water vapor ($H_2O$).

4. A multi-gas sensor, comprising:
a silicon substrate;
a plurality of chemical sensitive field effect transistor (CSFET) sensors formed on a surface of the silicon substrate, wherein each one of the plurality of CSFET sensors is decorated with a different material to detect a different gas associated with food spoilage;
a differential pulse voltammetry measurement circuit communicatively coupled to the plurality of CSFET sensors; and
a communication interface to connect to a computing device.

5. The multi-gas sensor of claim 4, wherein the differential pulse voltammetry measurement circuit comprises:
a microcontroller;
a plurality of transimpedance amplifiers communicatively coupled to the microcontroller; and
a voltage generator.

6. The multi-gas sensor of claim 5, wherein each one of the plurality of CSFET sensors is communicatively coupled to one of the plurality of transimpedance amplifiers.

7. The multi-gas sensor of claim 5, wherein the microcontroller, comprises:
an analog to digital converter; and
a low pass filter.

8. The multi-gas sensor of claim 4, wherein the communication interface comprises a universal serial bus (USB) connection.

9. A method to fabricate a multi-gas sensor, comprising:
providing a silicon substrate;
oxidizing the silicon substrate to grow an insulation layer;
patterning a plurality of chemical sensitive field effect transistor (CSFET) sensors on a surface of the silicon substrate, wherein the patterning comprises forming at least one of: a first CSFET sensor or a second CSFET sensor of the plurality of CSFET sensors on the surface of the silicon substrate; and
depositing a different material on each one of the plurality of CSFET sensors to detect a different gas associated with food spoilage, wherein the depositing, comprises at least one of:
sputtering a layer of ruthenium (Ru) on the first CSFET sensor; or
sputtering a layer of silicon oxide ($SiO_x$) on the second CSFET sensor.

10. The method of claim 9, wherein the patterning, further comprises:
forming a third CSFET sensor on the surface of the silicon substrate.

11. The method of claim 10, wherein the depositing, further comprises:
sputtering a layer of silver (Ag) on a third CSFET sensor.

12. The method of claim 11, wherein the layer of Ru is 1 nanometer (nm), the layer of Ag is 1 nm, and the layer of $SiO_x$ is 3 nm.

13. The method of claim 9, further comprising:
forming an ohmic contact region, wherein the ohmic contact region comprises a layer of nickel and a layer of tungsten.

14. The method of claim 9, further comprising:
annealing the plurality of CSFET sensors in a forming gas.

\* \* \* \* \*